(12) United States Patent
Danielsson et al.

(10) Patent No.: US 12,533,988 B2
(45) Date of Patent: Jan. 27, 2026

(54) METHOD FOR CONTROLLING CHARGING OF A BATTERY IN A VEHICLE

(71) Applicant: VOLVO TRUCK CORPORATION, Gothenburg (SE)

(72) Inventors: Ulf Danielsson, Gothenburg (SE); Virginie Harth, St Didier de Formans (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 38 days.

(21) Appl. No.: 18/421,452

(22) Filed: Jan. 24, 2024

(65) Prior Publication Data

US 2024/0253520 A1    Aug. 1, 2024

(30) Foreign Application Priority Data

Jan. 30, 2023    (EP) ..................... 23153910

(51) Int. Cl.
*B60L 7/16*    (2006.01)
*B60L 7/10*    (2006.01)
(Continued)

(52) U.S. Cl.
CPC ............... *B60L 58/13* (2019.02); *B60L 7/10* (2013.01); *B60L 53/62* (2019.02); *B60L 2240/62* (2013.01); *B60L 2240/64* (2013.01)

(58) Field of Classification Search
CPC .. B60L 58/13; B60L 7/10; B60L 53/62; B60L 2240/62; B60L 2240/64
See application file for complete search history.

(56) References Cited

U.S. PATENT DOCUMENTS 12,148,004 B2 * 11/2024 Logvinov ............... G07F 9/023
2015/0115886 A1    4/2015 Loftus et al.
(Continued)

FOREIGN PATENT DOCUMENTS

DE    102020112436 A1    11/2021
DE    102020118922 A1    1/2022
(Continued)

OTHER PUBLICATIONS

Extended European Search Report in corresponding European Application No. 23196645.8 dated Mar. 4, 2024, 7 pages.
(Continued)

*Primary Examiner* — Rexford N Barnie
*Assistant Examiner* — Esayas G Yeshaw
(74) *Attorney, Agent, or Firm* — Jeffri A. Kaminski; Venable LLP (57) ABSTRACT

A computer system comprising a processor device configured to determine altitude data of at least one of a charging location and a vehicle located at the charging location, determine topography in a predetermined area around the charging location, determine a maximum altitude drop of the topography in the predetermined area relative to the determined altitude data, instruct charging of a battery of the vehicle from an external power source of the charging location, stop the charging at a predetermined charging level below the nominally fully charged level of the battery in response to the maximum altitude drop being above a predetermined altitude drop threshold, stop the charging at the nominally fully charged level of the battery in response to the maximum altitude drop being below the predetermined altitude drop threshold.

20 Claims, 5 Drawing Sheets

(51) Int. Cl.
   *B60L 53/62* (2019.01)
   *B60L 58/13* (2019.01)

(56) References Cited

U.S. PATENT DOCUMENTS

| | | |
|---|---|---|
| 2020/0039370 A1* | 2/2020 | Hom ..................... H02J 7/0045 |
| 2020/0161874 A1* | 5/2020 | Ito ............................ B60L 7/10 |
| 2021/0001834 A1 | 1/2021 | Kim |
| 2021/0061120 A1 | 3/2021 | Park et al. |
| 2021/0213844 A1 | 7/2021 | Singuru et al. |
| 2022/0089056 A1 | 3/2022 | Rajmohan et al. |

FOREIGN PATENT DOCUMENTS

| | | |
|---|---|---|
| JP | 2020178428 A | 10/2020 |
| KR | 102054925 B1 | 12/2019 |

OTHER PUBLICATIONS

Extended European Search Report in corresponding European Application No. 23153910.7 dated Jun. 19, 2023 (8 pages).

* cited by examiner

METHOD FOR CONTROLLING CHARGING OF A BATTERY IN A VEHICLE

TECHNICAL FIELD

The disclosure relates generally to charging management of a battery in an energy storage system of a vehicle. In particular aspects, the disclosure relates to a computer implemented method for controlling charging of a battery in a vehicle at a charging location. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries or battery packs, which are configured to operate the electric machine as well as electrically driven auxiliary equipment. The electric machine and/or the electrically driven auxiliary equipment may be commonly referred to as a load. The battery, or battery pack, is periodically in need of charging.

One common solution to charge the battery of the vehicle is at a charging location by using a power transmitter connected to an external power source, such as e.g. a power grid or the electrical grid, by an electrical wire. Typically, the vehicle is parked at a charging station, or in a parking/charging spot providing such charging capabilities, and the driver or other personnel manually plug the power transmitter, e.g. a plug, into a power receiver, e.g. a socket of the vehicle. The socket is in electrical communication with the battery for enabling charging of the same. Another solution to charge the battery of the electric vehicle is by a wireless charging system. The wireless charging system typically includes a charging station having a power emitting coil, or transmission coil, configured to emit electromagnetic radiation. The wireless charging system typically further comprises a power receiving coil, preferably arranged on the electrical vehicle and in electrical communication with the battery, and being configured to receive the emitted electromagnetic radiation for charging the battery.

After the battery of the vehicle has been charged, the electric vehicle typically drives away from the charging location eventually resulting in a renewed need for charging. The vehicle may comprise a regenerative braking system configured to transfer the kinetic energy of the vehicle into stored energy by charging of the battery as the vehicle brakes or slows down. Hereby, the range of the vehicle may be extended, and the need for charging at a charging location postponed. However, in case the battery regeneration, i.e. the charging of the battery by the regenerative braking system, results in a nominally fully charged battery, further charging may damage the battery. In such cases, the kinetic energy of the vehicle, as the vehicle brakes or slows down, must be discarded by other means than the battery regeneration. For example, the energy from the regenerative braking system may be disposed externally of the battery, e.g. in a resistor consuming the produced electricity. However, such resistor is heated and must typically be cooled. Both the resistor and the means needed for cooling the resistor adds costs and/or results in wasting of energy.

SUMMARY

According to a first aspect of the disclosure, computer system comprising a processor device is provided. The processor device is configured to:
- determine altitude data of at least one of a charging location and a vehicle located at the charging location,
- determine topography in a predetermined area around the charging location,
- determine a maximum altitude drop of the topography in the predetermined area relative to the determined altitude data,
- instruct charging of a battery of the vehicle from an external power source of the charging location,
- stop the charging at a predetermined charging level below the nominally fully charged level of the battery in response to the maximum altitude drop being above a predetermined altitude drop threshold,
- stop the charging at the nominally fully charged level of the battery in response to the maximum altitude drop being below the predetermined altitude drop threshold.

The first aspect of the disclosure may seek to overcome problems relating to undesirable and unnecessary reaching of the nominally fully charged level of the battery during travelling of the vehicle subsequent to the charging of the battery. For a vehicle having a regenerative braking system configured to charge the battery by regenerative braking of the vehicle, when the nominally fully charged level of the battery is reached during travelling of the vehicle, typically in a downhill, the energy from the regenerative braking must be disposed externally of the battery (i.e. elsewhere than to the battery, e.g. by using a resistor burning the energy). As an alternative, the regenerative braking cannot be used, and the service brakes of the vehicle, if available, must be used in order to brake the vehicle. Thus, the first aspect of the disclosure may seek to overcome problems relating to the need of disposal of energy externally of the battery when braking the vehicle. That is, by determining the maximum altitude drop of the topography in the predetermined area relative to the determined altitude data, and to stop the charging in response to whether the maximum altitude drop is above or below the predetermined altitude drop threshold, the charging level of the battery can be adapted to reduce the risk of reaching of the nominally fully charged level of the battery during travelling of the vehicle and the need of disposing energy externally of the battery. Hereby, energy may be saved.

A technical benefit of the first aspect of the disclosure, may include that the stopping of the charging, at the predetermined charging level or the nominally fully charged level, can be determined in an advantageous manner. That is, as the stopping of the charging is determined in response to whether the maximum altitude drop is above or below the predetermined altitude drop threshold, a less complex way of determining whether stopping the charging at the predetermined charging level or the nominally fully charged level is provided. That is, as the maximum altitude drop of the topography in the predetermined area relative to the determined altitude data of the vehicle and/or the charging location is used to determine whether the charging of the battery is to be stopped at the predetermined charging level below the nominally fully charged level, or at the nominally fully charged level, there is no need to use complex calculations to determine or estimate the future regeneration of the battery by the regenerative braking system. Thus, the battery of the vehicle may be charged to a charging level adapted to the topography in the predetermined area by stopping the charging of the battery in response to whether the maximum altitude drop is above or below the predetermined altitude drop threshold.

According to a second aspect of the disclosure, a computer-implemented method is provided. The method comprises:
  determining, by a processor device of a computer system, altitude data of at least one of a charging location and a vehicle located at the charging location,
  determining, by the processor device, topography in a predetermined area around the charging location,
  determining a maximum altitude drop of the topography in the predetermined area relative to the determined altitude data,
  instructing, by the processor device, charging of a battery of the vehicle from an external power source of the charging location,
  stopping, by the processor device, the charging at a predetermined charging level below the nominally fully charged level of the battery in response to the maximum altitude drop being above a predetermined altitude drop threshold, and
  stopping the charging at the nominally fully charged level of the battery in response to the maximum altitude drop being below the predetermined altitude drop threshold.

The second aspect of the disclosure may seek to solve the same problem as described for the first aspect of the disclosure. Thus, effects and features of the second aspect of the disclosure are largely analogous to those described above in connection with the first aspect of the disclosure. Examples and embodiments mentioned in relation to the first aspect of the disclosure are largely compatible with the second aspect of the disclosure, and vice versa.

In some examples, the method may comprise comparing, by the processor device, the maximum altitude drop with the predetermined altitude drop threshold. In some examples, the method comprise stopping, by the processor device, the charging at the predetermined charging level below the nominally fully charged level of the battery if the maximum altitude drop is above the predetermined altitude drop threshold, and stopping, by the processor device, the charging at the nominally fully charged level of the battery if the maximum altitude drop is below the predetermined altitude drop threshold.

In some examples, the method further comprises receiving, by the processor device, measurement data from an altitude determining device, or altitude sensor of the vehicle and/or the charging location, wherein the measurement data comprises altitude data of the vehicle and/or the charging location. A technical benefit may include usage of reliable data and efficient handling and communication of data. The altitude determining device, or altitude sensor, may e.g. comprise a GPS. The GPS may e.g. comprise, or be configured to receive, map data. Thus, the altitude data may be comprised in the map data.

The altitude data is typically defined by the altitude of the vehicle and/or the charging location above sea level. Thus, the unit of the altitude data may be meter (m) or feet (ft). The determined topography typically comprises altitude information of the predetermined area, e.g. as determined by contour lines.

In some examples, the method further comprises performing, by the processor device, altitude mapping of the topography in the predetermined area, and determining, by the processor device, the maximum altitude drop of the topography in the predetermined area from the altitude mapping. A technical benefit may include efficient and reliable determination of the altitude drop in the predetermined area. In other words, the maximum altitude drop is the highest altitude drop from the altitude mapping relative to the altitude of the vehicle and/or charging location. The altitude mapping may be referred to as topography mapping and may e.g. be determined by using the contour lines of map data of the predetermined area.

In some examples, the altitude mapping comprises determining, by the processor device, a plurality of altitude drops in the predetermined area relative to the determined altitude data. A technical benefit may include efficient and reliable performance of the altitude mapping. For example, a plurality of positions at an altitude lower than the charging location and/or the vehicle located at the charging location is determined by the processor device, and the plurality of altitude drops is determined by the altitude difference between that of the charging location and/or vehicle and the plurality of positions. The plurality of positions is preferably the positions within the predetermined area having the lowest altitude, e.g. the five, or ten, lowest positions within the predetermined area.

In some examples, the method further comprises determining, by the processor device, the maximum altitude drop of the topography in the predetermined area as the largest altitude drop of the determined plurality of altitude drops from the altitude mapping. A technical benefit may include reliable determination of the maximum altitude drop in the predetermined area.

In some examples, the topography in the predetermined area around the charging location comprises road altitude data of the roads in the predetermined area. A technical benefit may include adequate determination of the altitude drops in the predetermined area. In some examples, the determined topography in the predetermined area is the road topography in the predetermined area. A technical benefit may include adequate determination of the maximum altitude drop in the predetermined area. That is, the maximum altitude drop in the predetermined area may be defined as the maximum road altitude drop in the predetermined area. The road topography may be subject to the previously mentioned altitude mapping. The road altitude data may be that of all the roads in the predetermined area. However, in some examples, the determined topography in the predetermined area is the topography of the whole predetermined area, i.e. not limited to the road topography.

In some examples, the method further comprises determining the maximum altitude drop of the topography in the predetermined area by the altitude difference between a road position having the lowest altitude in the predetermined area, and the determined altitude data of the charging location and/or the vehicle located at the charging location. A technical benefit may include adequate determination of the maximum altitude drop of the roads in the predetermined area. Thus, as the vehicle most likely will be travelling on a road in the predetermined area subsequent to charging the battery, the charging level of the battery is safeguarded for travelling on a road comprising the maximum altitude drop of the roads in the predetermined area.

In some examples, stopping, by the processor device, the charging at the predetermined charging level below the nominally fully charged level of the battery, or stopping, by the processor device, the charging at the nominally fully charged level of the battery, is determined solely in response to whether the maximum altitude drop is above or below the predetermined altitude drop threshold. A technical benefit may include a less complex way of determining whether to stop the charging at the predetermined charging level or at the nominally fully charged level. In some examples, the stopping of the charging at the predetermined charging level below the nominally fully charged level, and stopping the charging at the nominally fully charged level of the battery, are performed solely, or at least mainly, in response to whether the maximum altitude drop is above or below the predetermined altitude drop threshold. In other words, the outcome of whether the maximum altitude drop is above or below the predetermined altitude drop threshold is decisive, such as e.g. exclusively decisive, for the determination of whether the charging is stopped at the predetermined charging level below the nominally fully charged level of the battery, or at the nominally fully charged level of the battery. Thus, even in case the vehicle does not encounter the maximum altitude drop upon travelling in the predetermined area subsequent to charging the battery, the charging level of the battery is safeguarded for such encounter.

In some examples, stopping, by the processor device, the charging at the predetermined charging level below the nominally fully charged level of the battery, or stopping, by the processor device, the charging at the nominally fully charged level of the battery, is determined without calculating, by the processor device, the regenerative braking of the vehicle along the roads in the predetermined area. A technical benefit may include reduced need, or no need, to use complex calculations to determine or estimate the future regeneration of the battery by the regenerative braking system upon vehicle travelling in the predetermined area subsequent to charging the battery. Stated differently, stopping, by the processor device, the charging at the predetermined charging level below the nominally fully charged level of the battery, or stopping, by the processor device, the charging at the nominally fully charged level of the battery, is determined without using, or receiving, by the processor device, calculations of the regenerative braking of the vehicle along the roads in the predetermined area.

In some examples, stopping, by the processor device, the charging at the predetermined charging level below the nominally fully charged level of the battery, or stopping, by the processor device, the charging at the nominally fully charged level of the battery, is determined without receiving, by the processor device, a predetermined destination of the vehicle in the predetermined area. A technical benefit may include reduced need, or no need, to acquire sensitive data from the vehicle. Thus, the charging level of the battery may be safeguarded for encountering the maximum altitude drop in the predetermined area without using a predetermined destination of the vehicle.

However, in some examples, the method further comprises determining, by the processor device, a predetermined destination of the vehicle, the predetermined destination being separated from the charging location by a predetermined road, wherein the maximum altitude drop of the topography in the predetermined area relative to the determined altitude data is determined for the predetermined route. A technical benefit may include adequate determination of the maximum altitude drop in the predetermined area. That is, the determined topography may be the topography of the predetermined road, and thus, the maximum altitude drop in the predetermined area is determined by the maximum altitude drop of the predetermined road. Thus, as the vehicle will be travelling along the predetermined road in the predetermined area subsequent to charging the battery, the charging level of the battery is safeguarded for travelling on the predetermined road.

In some examples, the method further comprises setting, by the processor device, the predetermined area to a maximum radius of between 10 km and 50 km from the charging location. A technical benefit may include determination of the maximum altitude drop in the near, or close proximity, of the charging location or vehicle located at the charging location. In other words, a maximum altitude drop associated with an imminent downhill of the charging location, for which it is more likely to reach the nominally fully charged level of the battery during travelling of the vehicle subsequent to the charging of the battery, may be determined. In some examples, the method further comprises setting, by the processor device, the predetermined area to radius of between 0 km and 10 km, or between 0 km and 20 km, or between 0 km and 50 km from the charging location In some examples, the method further comprises setting, by the processor device, the predetermined altitude drop threshold to a value of: between 200 m and 300 m for a predetermined area having a radius of between 0 km and 10 km; or between 300 m and 600 m for a predetermined area having a radius of between 10 km and 20 km; or between 600 m and 1200 m for a predetermined area having a radius of between 20 km and 50 km. A technical benefit may include determination of the maximum altitude drop dependently of the size of the predetermined area.

According to a third aspect of the disclosure, an energy storage system of a vehicle is provided. The energy storage system comprises a battery connectable to regenerative braking system configured to charge the battery by regenerative braking of the vehicle, and a control unit configured to:

determine altitude data of at least one of a charging location and the vehicle located at the charging location, determine topography in a predetermined area around the charging location, determine a maximum altitude drop of the topography in the predetermined area relative to the determined altitude data, instruct charging of the battery of the vehicle from an external power source of the charging location, stop the charging at a predetermined charging level below the nominally fully charged level of the battery in response to the maximum altitude drop being above a predetermined altitude drop threshold, stop the charging at the nominally fully charged level of the battery in response to the maximum altitude drop being below the predetermined altitude drop threshold.

The third aspect of the disclosure may seek to solve the same problem as described for the first and second aspects of the disclosure. Thus, effects and features of the third aspect of the disclosure are largely analogous to those described above in connection with the first and second aspects of the disclosure. Examples and embodiments mentioned in relation to the first and second aspects of the disclosure are largely compatible with the third aspect of the disclosure, and vice versa.

In some examples, the battery is a battery pack comprising several series-connected and/or parallel connected battery cells.

According to a fourth aspect of the disclosure, a charging location for charging a battery of a vehicle is provided. The charging location comprises an external power source and a control unit configured to:
- determine altitude data of at least one of the charging location and a vehicle located at the charging location,
- determine topography in a predetermined area around the charging location,
- determine a maximum altitude drop of the topography in the predetermined area relative to the determined altitude data,
- instruct charging of a battery of the vehicle from the external power source of the charging location,
- stop the charging at a predetermined charging level below the nominally fully charged level of the battery in response to the maximum altitude drop being above a predetermined altitude drop threshold,
- stop the charging at the nominally fully charged level of the battery in response to the maximum altitude drop being below the predetermined altitude drop threshold.

The fourth aspect of the disclosure may seek to solve the same problem as described for the first, and second aspects of the disclosure. Thus, effects and features of the fourth aspect of the disclosure are largely analogous to those described above in connection with the first and second aspects of the disclosure. Examples and embodiments mentioned in relation to the first and second aspects of the disclosure are largely compatible with the fourth aspect of the disclosure, and vice versa.

In some examples, applicable to any aspect of the disclosure, the charging location is, or is comprised in, a charging station. The external power source of the charging location or charging station is typically connected to an electrical grid, such as a main electrical grid. The charging location may be a location, such as e.g. a parking slot, providing a charging post or a charging socket allowing the driver of the vehicle to plug in the vehicle for charging of the battery.

According to a fifth aspect of the disclosure, a vehicle comprising the processor device to perform the method of the second aspect of the disclosure, or comprising the energy storage system of the third aspect of the disclosure, is provided. The processor device may e.g. be that of the first aspect of the disclosure.

The vehicle is typically referred to as an electric vehicle. The battery is typically a high voltage battery configured to power an electric traction machine of the electric vehicle.

In some examples, the vehicle further comprises the regenerative braking system configured to charge the battery by regenerative braking of the vehicle, and a service braking system configured to brake the vehicle independently of the regenerative braking system.

According to a sixth aspect of the disclosure, a computer program product comprising program code for performing, when executed by the processor device, the method of the second aspect of the disclosure is provided.

According to a seventh aspect of the disclosure, a control system comprising one or more control units configured to perform the method of the second aspect of the disclosure is provided.

According to a eighth aspect of the disclosure, a non-transitory computer-readable storage medium comprising instructions, which when executed by the processor device, cause the processor device to perform the method of the second aspect of the disclosure is provided.

The fifth to eight aspects of the disclosure may seek to solve the same problem as described for the first and second aspects of the disclosure. Thus, effects and features of the fifth to eight aspects of the disclosure are largely analogous to those described above in connection with the first to fourth aspects of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

DETAILED DESCRIPTION

Aspects set forth below represent the necessary information to enable those skilled in the art to practice the disclosure. The object of the present inventive concept is to solve the problem relating to undesirable and unnecessary reaching of the nominally fully charged level of the battery during travelling of the vehicle subsequent to the charging of the battery, e.g. related to the need of disposal of energy externally of the battery when braking the vehicle. The inventive concept solves the problem by, inter alia, determining the maximum altitude drop of the topography in the predetermined area relative to the determined altitude data, and to stop the charging in response to whether the maximum altitude drop is above or below the predetermined altitude drop threshold. Hereby, the charging level of the battery can be adapted to reduce the risk of reaching of the nominally fully charged level of the battery during travelling of the vehicle and the need of disposing energy externally of the battery.

Figure 1:
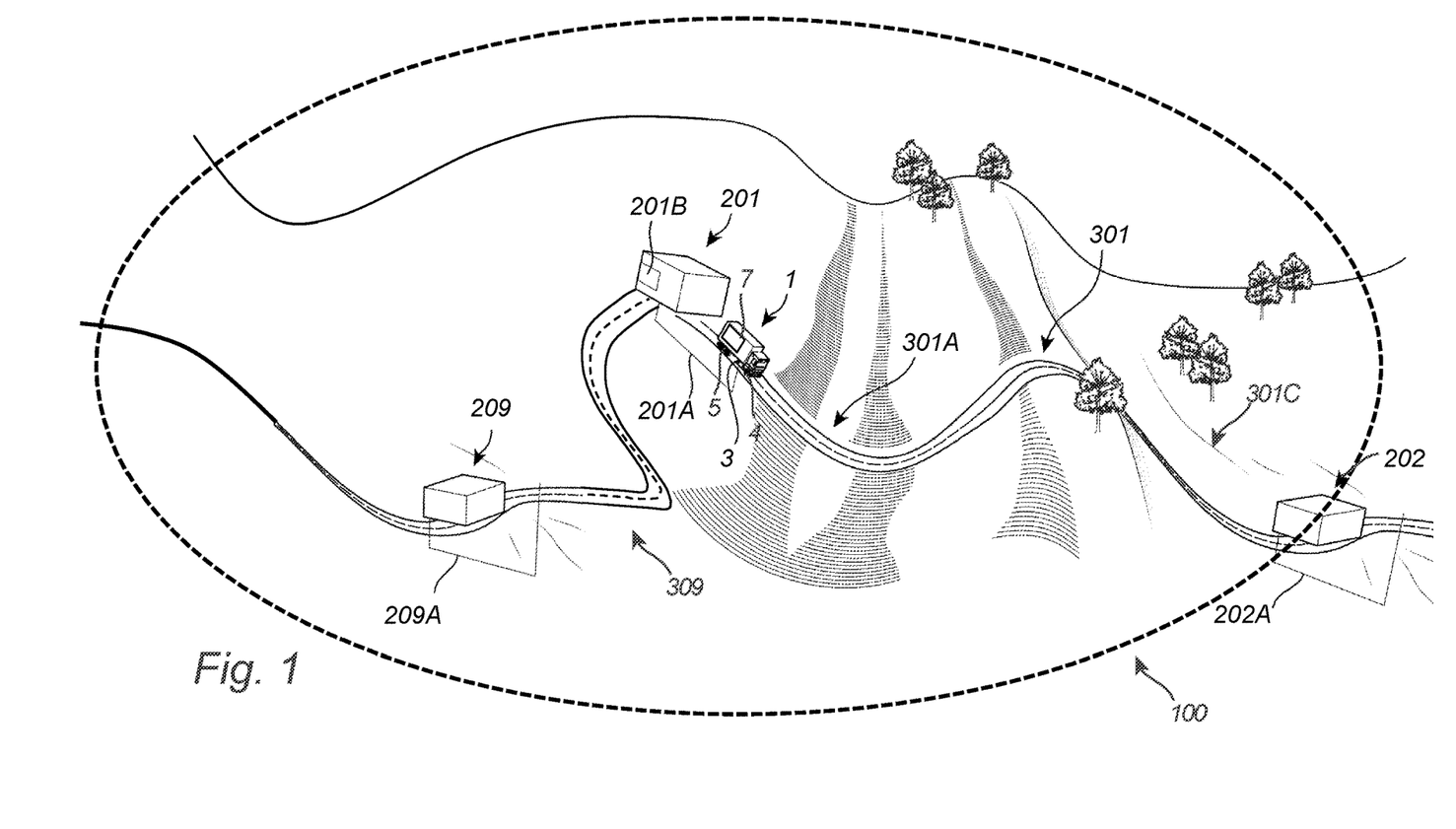
FIG. 1 is a schematic view of a predetermined area around a charging location, and of a vehicle charging at a charging location being a first charging station, according to one example.

FIG. 1 shows an exemplary charging location 201 and a vehicle 1 located at the charging location 201. The charging location 201 is in FIG. 1 a first charging station 201 comprising a first external power source 201A, e.g. in the form of a cable connected to the electrical grid. The charging may as well be achieved by a wireless charging system (not shown), such as an inductive charging system comprising a transmitting coil and a receiving coil of which one is arranged on the vehicle 1. FIG. 1 also show a predetermined area 100 of the surroundings of the charging location 201. In, or at the border of, the predetermined area 100 is at least two more charging locations 202, 209 located in the form of a second charging station 202 and a third charging station 209. The second and third charging stations 202, 209 comprises corresponding external power sources 202A, 209A. The first charging station 201 is separated from the second charging station 202 by a first predetermined road 301, and is separated from the third charging station 309 by a second predetermined road 309.

Figure 2:
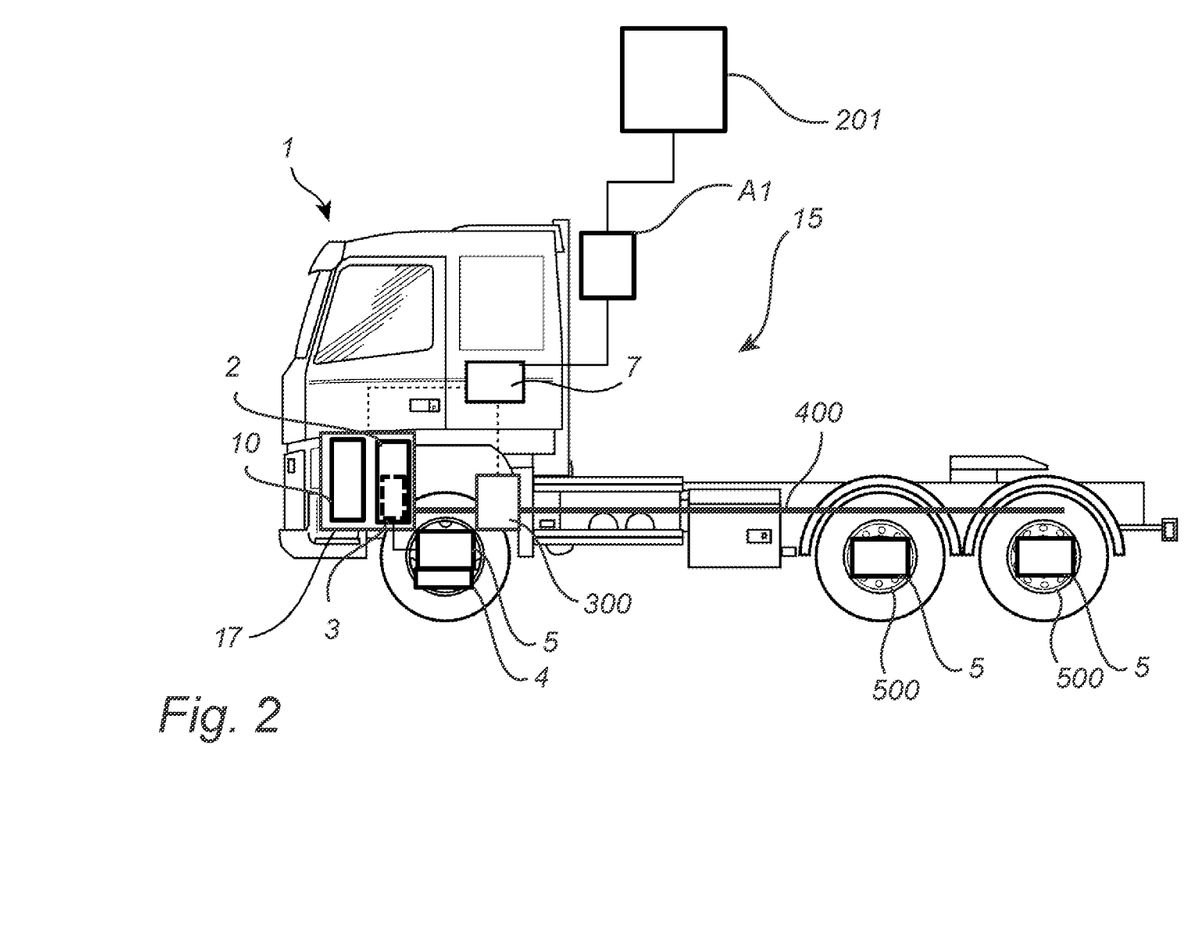
FIG. 2 is an exemplary, partly schematic, side view of a vehicle comprising an energy storage system having a at least one battery, and a control unit according to one example.

FIG. 2 shows the vehicle 1 of FIG. 1 in greater detail. The vehicle 1 is a heavy duty truck being an electric vehicle, such as a full electric vehicle or a hybrid, comprising a powertrain 15 having an electric driveline 17 comprising an energy storage system 2 including at least one battery 3, and a at least one electric machine 10 powered by the battery 3. As seen in FIG. 2, the powertrain 15 may further comprise a transmission 300 comprising at least a gearbox, and drive shafts 400 configured to transfer motion to the drive wheels 500. The battery 3 is configured to be charged at charging locations 201, 202, 209 such as e.g. at the first charging station 201 at which the vehicle 1 is located in FIG. 1.

The vehicle 1 typically comprises a regenerative braking system 4 of a known type connectable to the battery 3. The regenerative braking system 4 generally comprises a kinetic energy recovery system configured to transfer kinetic energy of an object in motion, i.e. the vehicle 1, into stored energy, i.e. charging of the battery 3, to slow the vehicle 1 down. For example, the regenerative braking system 4 may comprise an electric generator, which preferably is the same component as the previously mentioned electric machine 10. Thus, the energy produced when slowing the vehicle 1 down, typically by braking, is stored chemically in the battery 3 (i.e. regenerative charging of the battery 3, or simply battery regeneration).

The vehicle 1 typically comprises service brakes 5 of a known type, here embodied as brakes 5 on the wheels 500 of the front axle and the two rear axles. The service brakes 5 forms a separate braking arrangement to the regenerative braking system 4. Thus, the braking of the vehicle 1 can be achieved by the service brakes 5 and/or the regenerative braking system 4. The braking capacity of the regenerative braking system 4 is at least limited by the amount of energy which can be stored in the battery 3 (i.e. when reaching the nominally fully charged level), and the braking capacity of the service brakes 5 is e.g. correlated to the temperature of the service brakes 5. If the temperature of the service brakes 5 becomes overheated, or too high (e.g. critically high) the function of the service brakes 5 may be impaired, or even lost. Thus, it is generally preferred to use the regeneration braking system 4 over the service brakes 5. The regenerative braking system 4 is typically connected to a drive axle of the vehicle 1, which may be the front axle or one of the rear axles, and the service brakes 5 are typically connected to the wheels of all axles, e.g. the front axle and the two rear axles.

Figure 3:
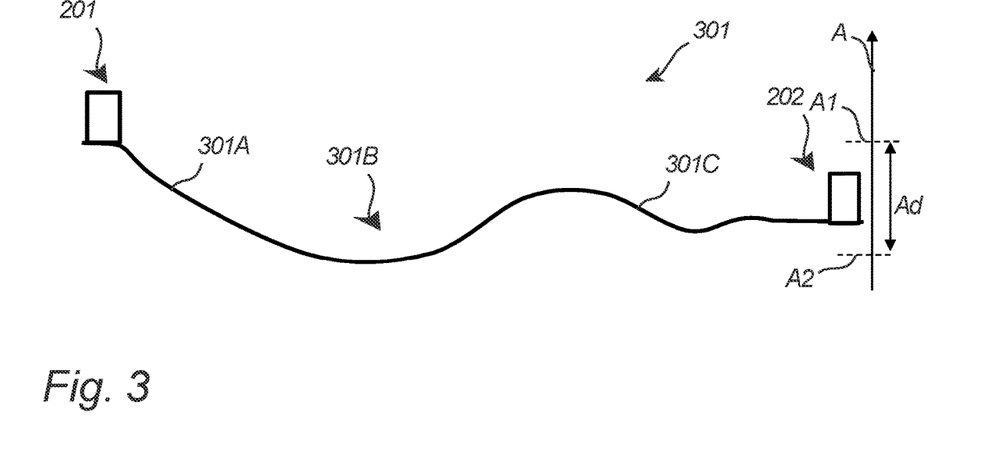
FIG. 3 is a schematic side view of at least a part of the predetermined area of FIG. 1, according to one example.

Turning back to FIG. 1, and with further reference to FIG. 3, being a schematic side view of the first predetermined road 301 of FIG. 1, the topography of the surroundings in the predetermined area 100 results in various positions being located at various altitudes. For example, the first charging station 201 is located at a higher altitude than the second charging station 202. Thus, the first predetermined road 301 comprises a downhill, exemplified in FIGS. 1 and 3 as a first downhill portion 301A and a second downhill portion 301C.

As shown in FIG. 1, the vehicle 1 comprises a control unit 7 configured to control the charging of the battery 3 of the vehicle 1. Additionally, or alternatively, the first charging station 201 comprises a control unit 201B configured to control the charging of the battery 3 of the vehicle 1. The control unit 7 of the vehicle and/or the control unit 201B of the first charging station 201 may be referred to as a computer system comprising a processor device which is configured to control the charging of the battery 3 of the vehicle 1. In the following, it is assumed that the control unit 201B of the charging station 201 controls the charging of the battery 3, and not the control unit 7 of the vehicle 1, but in some examples it could be the other way around, i.e. that the control unit 7 of the vehicle 1 controls the charging of the battery 3, and not the control unit 201B of the charging station 201. As a further alternative, the control unit 7 of the vehicle 1 and the control unit 201B of the charging station 201 together control the charging of the battery 3.

The control unit 201B is configured to determine altitude data of at least one of the first charging station 201 and the vehicle 1 located at the first charging station 201. Thus, the control unit 201B is configured to acquire, and/or store, data of the altitude of the first charging station 201 and/or the vehicle 1 located at the first charging station 201.

The control unit 201B is configured to determine topography in the predetermined area 100 around the first charging station 201 and/or the vehicle 1 located at the first charging station 201. Thus, control unit 201B is configured to acquire, and/or store, topography data of the surroundings of the first charging station 201, at least corresponding to the predetermined area 100. The determined topography typically comprises altitude information of the predetermined area 100, e.g. as determined by contour lines in map data.

Turning briefly to FIG. 3, the altitude variations along the first predetermined road 301 is shown in greater detail, represented by the vertical axis A. The first predetermined road 301 extends from the first charging station 201 to the second charging station 202 and comprises a first downhill portion 301A and a second downhill portion 301C. The first charging station 201 is located at the highest altitude A1 along the road, and at the end of the first downhill portion 301A, a road position 301B having the lowest altitude A2 along the first predetermined road 301 road is located. The altitude difference Ad between the highest altitude A1 and the lowest altitude A2 along the first predetermined road 301 is thus the altitude difference between the first charging station 201, or the vehicle 1 located at the first charging station 201 (as shown in FIG. 1).

Thus, the control unit 201B may in general be configured to determine the maximum altitude drop of the topography in the predetermined area 100 by the altitude difference Ad between a road position having the lowest altitude A2 in the predetermined area 100, which in the example above is the road position 301B at the end of the first downhill portions 301A, and the determined altitude data A1 of the charging location and/or the vehicle located at the charging location, which in the example above is the first charging station 201, or the vehicle 1 located at the first charging station 201.

In more detail, and with reference to FIGS. 1 and 3, the control unit 201B is generally configured to determine the maximum altitude drop Ad of the topography in the predetermined area 100 relative to the determined altitude data. That is, as the altitude data of the first charging station 201 and/or the vehicle 1 located at the first charging station 201 is determined by the control unit 201B, as well as the topography in the predetermined area 100, the control unit 201B may determine the maximum altitude drop relative to the first charging station 201B and/or the vehicle 1 located at the first charging station 201, in the predetermined area 100. The determined topography may be that of the predetermined first road 301, shown in FIG. 3, and thus, the maximum altitude drop in the predetermined area 100 may be determined as the maximum altitude drop Ad of the predetermined first road 301. As an alternative, the maximum altitude drop in the predetermined area 100 may be determined as the maximum altitude drop Ad in the whole predetermined area 100, i.e. without particularly considering the roads in the predetermined area 100. The control unit 201B may be configured to perform altitude mapping of the topography in the predetermined area 100, and determine the maximum altitude drop Ad of the topography in the predetermined area 100 from the altitude mapping, as will be further described with reference to FIG. 5.

Charging of the battery 3 of the vehicle 1, and stopping the charging of the battery 3, will now be described in further detail.

The control unit 201B is configured to instruct charging of the battery 3 of the vehicle 1 from the first external power source 201A of the first charging station 201. Hereby, charging of the battery 3 may be performed by the first charging station 201 using the first external power source 201A.

Figure 4:
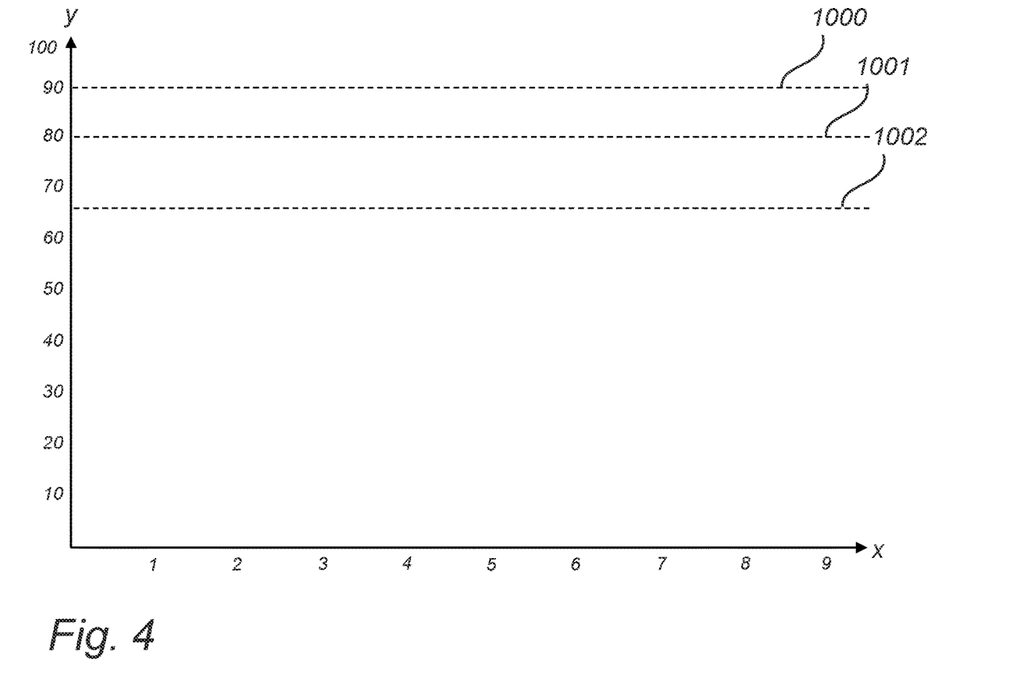
FIG. 4 is a graph representing the level of charge of the battery of the vehicle of FIGS. 1-2, according to one example.

Reference is additionally made to FIG. 4, showing a graph representing the level of charge of the battery 3 on the y-axis, e.g. represented by the SoC of the battery 3, over time (x-axis). In FIG. 4, the various charging levels have been illustrated by straight dashed lines for simplicity, and typically represent the charging level of the battery 3 at the corresponding charging location subsequent to stopping the charging, but prior to that the vehicle 1 drives away from the charging location. As the vehicle 1 travels away from a charging location, and along e.g. the first predetermined road 301, the charging level of the battery 3 typically varies over time (being reduced as energy is drawn from the battery 3, and increased as regenerative energy is charged to the battery 3). The control unit 201B is for example configured to stop the charging of the battery 3 at predetermined charging levels 1001, 1002 below the nominally fully charged level 1000, or at the nominally fully charged level 1000, as shown in the graph of FIG. 4.

In the example of FIG. 4, the charging of the battery 3 is determined by the State-of-Charge, SoC. SoC refers to the level of charge of the battery relative to its capacity. The units of SoC are typically in percentage points (0%=empty; 100%=full). However, SoC constraints may be used to reduce unnecessary deterioration of the battery 3. Thus, the nominally fully charged level may be set to a SoC of 90% (or being rated to 100%). Correspondingly, the lower SoC limit may be set higher than 0%, such that the battery 3 is configured to be operated by default predetermined SOC limits extending from a lower default SOC limit having a SOC-value between 10% and 15%, to an upper default SOC limit having a SOC-value between 75% and 90%. In the example FIG. 4, the upper default SOC limit is set to 90%, and thus corresponds to the nominally fully charged level of the battery 3. Therefore, the lower limit of 0% and the upper limit of 100% may be defined as the absolute SOC limits of the battery. However, in some examples, the nominally fully charged level is set to a SoC of 100%.

In FIG. 4, two predetermined charging levels below the nominally fully charged level 1000 are shown, the predetermined charging levels being a first predetermined charging level 1001 and a second predetermined charging level 1002. Thus, instead of charging the battery 3 to the nominally fully charged level 1000, the charging may be stopped at the first predetermined charging level 1001 or at the second predetermined charging level 1002. Thus, subsequent to charging, as the vehicle 1 drives away from the charging location, the charging level of the battery is at the first predetermined charging level 1001 or at the second predetermined charging level 1002, instead of at the nominally fully charged level 1000. However, during the subsequent operation of the battery 3, e.g. during travelling along the first predetermined road 301, the battery 3 may still be operated according to default predetermined SOC limits (i.e. being able to reach the nominally fully charged level 1000 during travelling of the vehicle 1).

The control unit 201B is configured to stop the charging of the battery 3 at a predetermined charging level, e.g. the first or second predetermined charging level 1001, 1002, below the nominally fully charged level 1000 of the battery 3. This is achieved in response to the maximum altitude drop Ad being above a predetermined altitude drop threshold.

The control unit 201B is configured to stop the charging of the battery 3 at the nominally fully charged level 1000 of the battery 3. This is achieved in response to the maximum altitude drop Ad being below the predetermined altitude drop threshold.

That is, the maximum altitude drop Ad of the topography in the predetermined area 100 is used to determine whether the charging of the battery 3 is to be stopped at the predetermined charging level 1001, 1002 below the nominally fully charged level 1000, or at the nominally fully charged level 1000. Hereby, the need of disposal of energy externally of the battery when braking the vehicle during travelling of the vehicle 1 subsequent to charging the battery 3 is reduced, as the risk of reaching the nominally fully charged level 1000 of the battery 3 during such travelling is reduced.

For example, the control unit 201B may be configured to compare the maximum altitude drop with the predetermined altitude drop threshold, prior to determining whether to stop the charging at the predetermined charging level 1001, 1002 below the nominally fully charged level 1000, or at the nominally fully charged level 1000.

As mentioned above, the control unit 7 of the vehicle 1 may control the charging of the battery 3 instead of the control unit 201B of the charging station 201. Thus, by referring to FIG. 2 and the energy storage system 2 thereof, the control unit 7 may be configured to control the operation of the energy storage system 2, and be at least configured to:

determine altitude data of at least one of a charging location and the vehicle located at the charging location, determine topography in a predetermined area around the charging location, determine a maximum altitude drop of the topography in the predetermined area relative to the determined altitude data, instruct charging of the battery of the vehicle from an external power source of the charging location, stop the charging at a predetermined charging level below the nominally fully charged level of the battery in response to the maximum altitude drop being above a predetermined altitude drop threshold, stop the charging at the nominally fully charged level of the battery in response to the maximum altitude drop being below the predetermined altitude drop threshold.

As seen in FIG. 2, the control unit 7 of the vehicle 1 may receive the altitude data A1 from the charging location, here the first charging station 201, wherein the altitude data comprises data of the altitude of charging location and/or the vehicle located at the charging location. As an alternative, the altitude data A1 may be received by a GPS sensor and map data.

Figure 5:
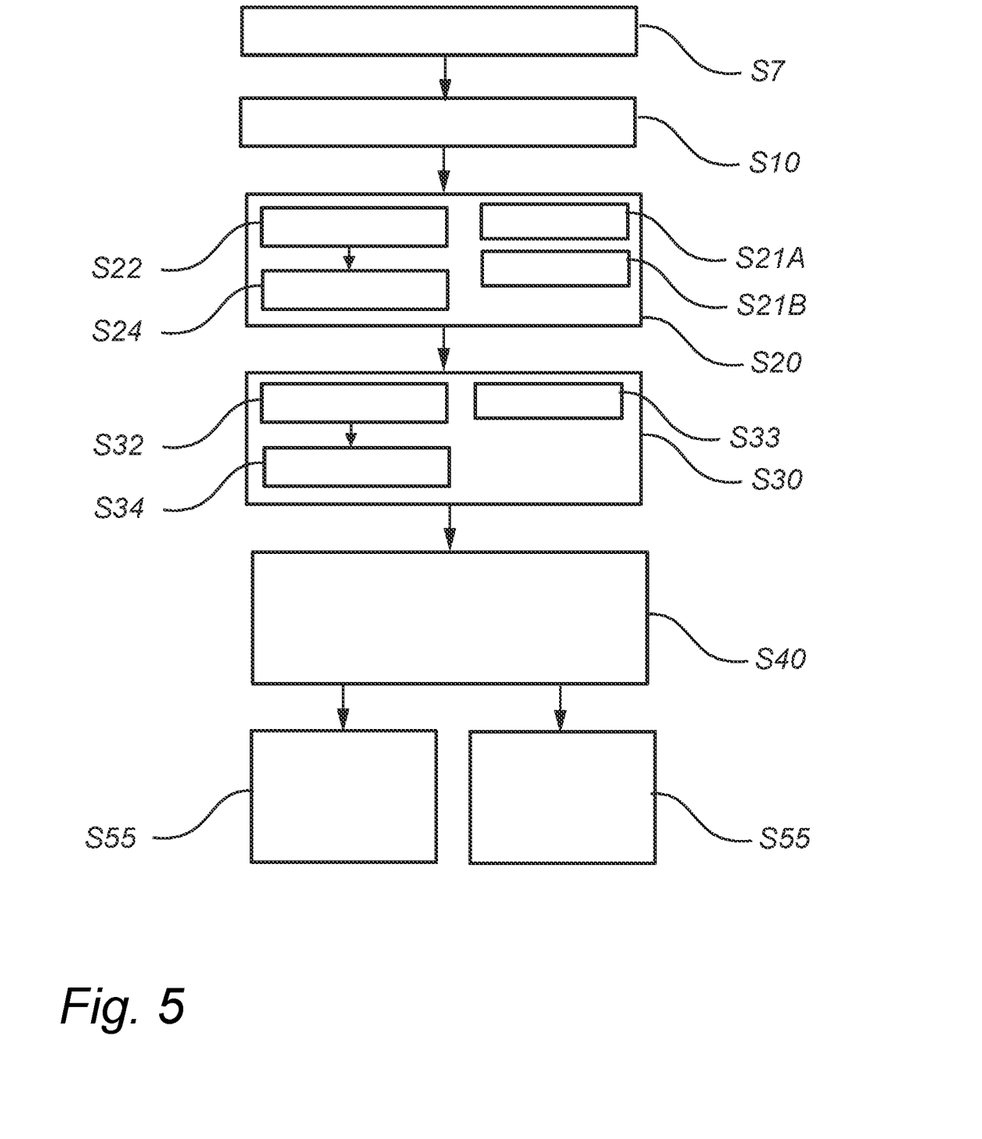
FIG. 5 is a flowchart illustrating the steps of a method according to one example.

FIG. 5 is a flow chart of a computer implemented method for controlling charging of a battery in a vehicle at a charging location, such as the battery 3 of the vehicle 1 at the first charging station 201 of FIG. 1. Thus, reference will be further made to FIGS. 1-4 in the following.

In a step S10, e.g. being a first step S10, altitude data A1 of at least one of a charging location and a vehicle located at the charging location is determined by a processor device of a computer system. For example, and with reference to FIG. 1, the charging location may be the first charging station 201, and the processor device may be comprised in the control unit 201B of the first charging station 201, and/or in the control unit 7 of the vehicle 1.

In a step S20, e.g. being a second step S20, topography in a predetermined area around the charging location is determined by the processor device. For example, the predetermined area may be the that of FIG. 1. The determined topography in the predetermined area around the charging location may e.g. comprises road altitude data of the roads in the predetermined area, or be determined as road altitude data of the roads in the predetermined area. That is, in some examples, the determined topography in the predetermined area is the topography of the whole predetermined area, i.e. not limited to the road topography, and in some examples the determined topography in the predetermined area is limited to the road topography in the predetermined area, or at least comprises the road topography in the predetermined area.

In an optional step S21A, being e.g. a sub-step in step S20, the predetermined area is set, by the processor device, to a maximum radius of between 10 km and 50 km from the charging location. With reference to FIG. 1, the predetermined area 100 may thus be defined as an area, e.g. a circular area with the first charging station 201 at its center, and having a maximum radius of between 10 km and 50 km. In an alternative optional step S21B, being e.g. a sub-step in step S20, and carried out instead of optional step 21A, the predetermined altitude drop threshold is set, by the processor device, to a value of: between 200 m and 300 m for a predetermined area having a radius of between 0 km and 10 km; or between 300 m and 600 m for a predetermined area having a radius of between 10 km and 20 km; or between 600 m and 1200 m for a predetermined area having a radius of between 20 km and 50 km.

In an optional step S22, being e.g. a sub-step in step S20, altitude mapping of the topography in the predetermined area is performed by the processor device. For example, in an optional step S24 performed subsequent to step S22, a plurality of altitude drops is determined in the predetermined area relative to the determined altitude data.

In a step S30, e.g. being a third step S30, a maximum altitude drop Ad of the topography in the predetermined area relative to the determined altitude data is determined by the processor device. In an optional step S32, being e.g. a sub-step in step S30, and in response to step S20, the maximum altitude drop Ad of the topography in the predetermined area is determined by the processor device from the altitude mapping. For example, in an optional step S34 performed subsequent to step S32, the maximum altitude drop Ad of the topography in the predetermined area is determined as the largest altitude drop of the determined plurality of altitude drops from the altitude mapping.

In an optional step S33, being e.g. a sub-step in step S30, the maximum altitude drop Ad of the topography in the predetermined area is determined by the processor device by the altitude difference between a road position 301B having the lowest altitude A2 in the predetermined area, and the determined altitude data of the charging location and/or the vehicle located at the charging location.

In a step S40, e.g. being a fourth step S40, charging of a battery of the vehicle from an external power source of the charging location is instructed by the processor device. For example, and with reference to FIG. 1, the battery 3 of the vehicle 1 is charged by the first external power source 201B of the first charging location 201.

In a step S50, e.g. being a fifth step S50, in response to the maximum altitude drop Ad being above a predetermined altitude drop threshold, the charging is stopped by the processor device at a predetermined charging level 1001, 1002 below the nominally fully charged level 1000 of the battery. With reference to FIG. 4, the charging may be stopped at the first predetermined charging level 1001 or at the second predetermined charging level 1002. For example, depending on the size of the maximum altitude drop, the first predetermined charging level 1001 or at the second predetermined charging level 1002 may be chosen. For example, in response to that the maximum altitude drop is above a predetermined higher altitude drop threshold, the charging is be stopped at the second predetermined charging level 1002, allowing more regenerative charging of the battery 3 compared to if the first predetermined charging level 1001 had been chosen.

In a step S55, e.g. being a fifth step S55 performed instead of step S50, and in response to the maximum altitude drop being below the predetermined altitude drop threshold, the charging is stopped by the processor device at the nominally fully charged level 1000 of the battery.

The step S55 of stopping the charging at the predetermined charging level 1001, 1002 below the nominally fully charged level 1000 of the battery, or the step S55 of stopping the charging at the nominally fully charged level 1000 of the battery, may be determined solely in response to whether the maximum altitude drop Ad is above or below the predetermined altitude drop threshold. In other words, the outcome of whether the maximum altitude drop Ad is above or below the predetermined altitude drop threshold is decisive, such as e.g. exclusively decisive, for the determination of whether the charging is stopped at the predetermined charging level 1001, 1002 below the nominally fully charged level 1000 of the battery, or at the nominally fully charged level 1000 of the battery The step S55 of stopping the charging at the predetermined charging level 1001, 1002 below the nominally fully charged level 1000 of the battery, or the step S55 of stopping the charging at the nominally fully charged level 1000 of the battery, may be determined without calculating, by the processor device, the regenerative braking of the vehicle along the roads in the predetermined area. Thus, there is no need for determining details of the regenerative charging of the battery during travelling of the vehicle subsequent to charging the battery. Stated differently, stopping, the charging at the predetermined charging level 1001, 1002 below the nominally fully charged level 1000 of the battery, or stopping, the charging at the nominally fully charged level 1000 of the battery, is determined without using calculations of the regenerative braking of the vehicle along the roads in the predetermined area 100.

The step S55 of stopping the charging at the predetermined charging level 1001, 1002 below the nominally fully charged level 1000 of the battery, or the step S55 of stopping the charging at the nominally fully charged level 1000 of the battery, may be determined without receiving, by the processor device, a predetermined destination of the vehicle in the predetermined area. Thus, there is a reduced need, or no need, to acquire sensitive data from the vehicle.

As an alternative, in an optional step S7, performed e.g. prior to step S10, a predetermined destination of the vehicle is determined by the processor device, the predetermined destination being separated from the charging location by a predetermined road. Thus, the step S20 of determining the topography in the predetermined area around the charging location may be performed by determining the road topography of the predetermined road. With reference to FIG. 3, the determined topography may be that of the first predetermined road 301. Moreover, the step S30 of determining a maximum altitude drop Ad of the topography in the predetermined area relative to the determined altitude data may be performed by determining the maximum altitude drop for the predetermined route.

The control unit 7 of the vehicle 1 in FIGS. 1-2 may be configured to perform the method as described with reference to FIG. 5. The method as described with reference to FIG. 5 may thus be implemented in a computer program product comprising program code for performing, when executed by the processor device, the method described with reference to FIG. 5. Alternatively the method as described with reference to FIG. 5 may be implemented in a non-transitory computer-readable storage medium comprising instructions, which when executed by the processor device, cause the processor device to perform the method as described with reference to FIG. 5. Thus, the control unit 7 may comprise instructions to cause the energy storage system 2 to be operated according to at least some of the steps described with reference to FIG. 5.

The control unit 7 of the vehicle 1 of FIGS. 1-2 may constitute, or be comprised in, a control system comprising one or more control units configured to perform the method as described with reference to FIG. 5. Such control system 1000 is now described with reference to FIG. 6.

Figure 6:
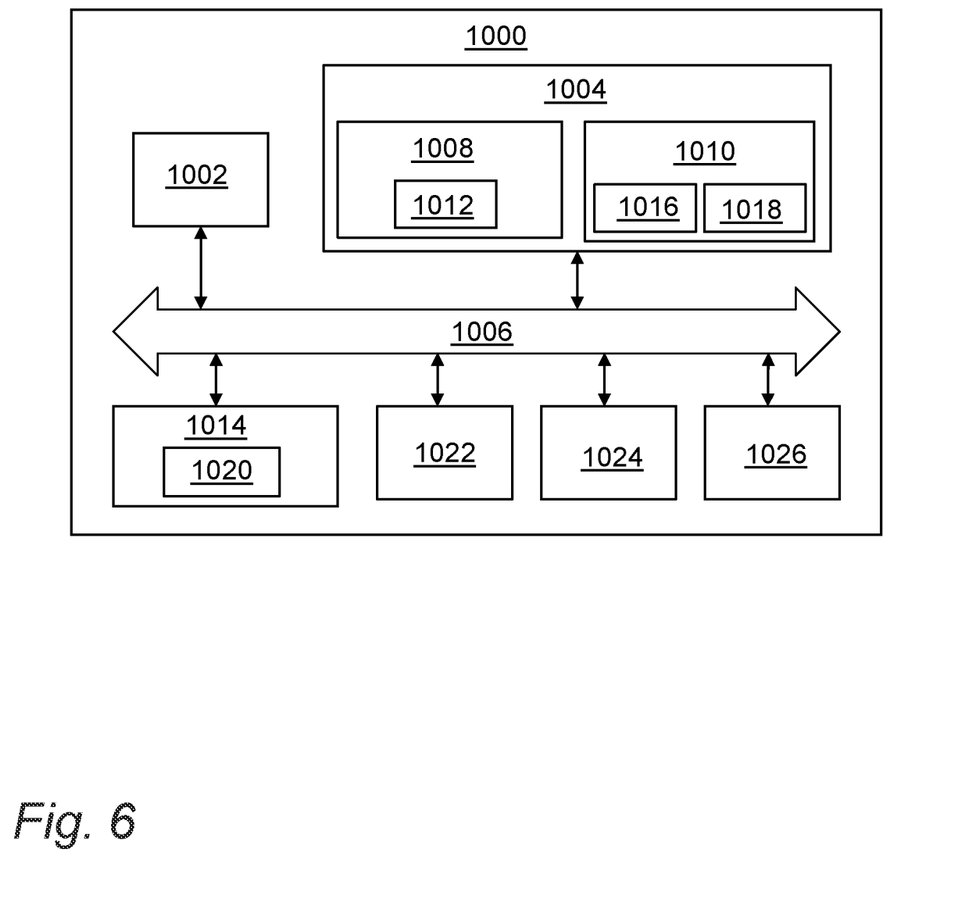
FIG. 6 is a schematic diagram of an exemplary computer system for implementing examples disclosed herein, according to one example.

FIG. 6 is a schematic diagram of a computer system 1000 for implementing examples disclosed herein, e.g. the method as described with reference to FIG. 5. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processor device 1002 (may also be referred to as a control unit), a memory 1004, and a system bus 1006. The computer system 1000 may include at least one computing device having the processor device 1002. The system bus 1006 provides an interface for system components including, but not limited to, the memory 1004 and the processor device 1002.

The processor device 1002 may include any number of hardware components for conducting data or signal processing or for executing computer code stored in memory 1004. The processor device 1002 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processor device 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processor device 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program product 1020 stored on a transitory or non-transitory computer-usable or computer-readable storage medium (e.g., single medium or multiple media), such as the storage device 1014, which includes complex programming instructions (e.g., complex computer-readable program code) to cause the processor device 1002 to carry out the steps described herein. Thus, the computer-readable program code can comprise software instructions for implementing the functionality of the examples described herein when executed by the processor device 1002. The processor device 1002 may serve as a controller or control system for the computer system 1000 that is to implement the functionality described herein.

The computer system 1000 also may include an input device interface 1022 (e.g., input device interface and/or output device interface). The input device interface 1022 may be configured to receive input and selections to be communicated to the computer system 1000 when executing instructions, such as from a keyboard, mouse, touch-sensitive surface, etc. Such input devices may be connected to the processor device 1002 through the input device interface 1022 coupled to the system bus 1006 but can be connected through other interfaces such as a parallel port, an Institute of Electrical and Electronic Engineers (IEEE) 1394 serial port, a Universal Serial Bus (USB) port, an IR interface, and the like. The computer system 10100 may include an output device interface 1024 configured to forward output, such as to a display, a video display unit (e.g., a liquid crystal display (LCD) or a cathode ray tube (CRT)). The computer system 1000 may also include a communications interface 1026 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence. Thus, it should be noted that the naming of the steps not necessarily, but might according to at least one example, relate to the order in which the steps are carried out.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:
   determine altitude data of at least one of a charging location and a vehicle located at the charging location,
   determine topography in a predetermined area around the charging location,
   determine a maximum altitude drop of the topography in the predetermined area relative to the determined altitude data,
   instruct charging of a battery of the vehicle from an external power source of the charging location,
   stop the charging at a predetermined charging level below the nominally fully charged level of the battery in response to the maximum altitude drop being above a predetermined altitude drop threshold,
   stop the charging at the nominally fully charged level of the battery in response to the maximum altitude drop being below the predetermined altitude drop threshold.

2. A computer-implemented method, comprising:
   determining, by a processor device of a computer system, altitude data of at least one of a charging location and a vehicle located at the charging location,
   determining, by the processor device, topography in a predetermined area around the charging location,
   determining a maximum altitude drop of the topography in the predetermined area relative to the determined altitude data,
   instructing, by the processor device, charging of a battery of the vehicle from an external power source of the charging location, stopping, by the processor device, the charging at a predetermined charging level below the nominally fully charged level of the battery in response to the maximum altitude drop being above a predetermined altitude drop threshold, and stopping the charging at the nominally fully charged level of the battery in response to the maximum altitude drop being below the predetermined altitude drop threshold.

3. The method of claim 2, further comprising:
performing, by the processor device, altitude mapping of the topography in the predetermined area, and
determining, by the processor device, the maximum altitude drop of the topography in the predetermined area from the altitude mapping.

4. The method of claim 3, wherein the altitude mapping comprises determining, by the processor device, a plurality of altitude drops in the predetermined area relative to the determined altitude data.

5. The method of claim 4, further comprising:
determining, by the processor device, the maximum altitude drop of the topography in the predetermined area as the largest altitude drop of the determined plurality of altitude drops from the altitude mapping.

6. The method of claim 2, wherein the topography in the predetermined area around the charging location comprises road altitude data of the roads in the predetermined area.

7. The method of claim 2, further comprising:
determining the maximum altitude drop of the topography in the predetermined area by the altitude difference between a road position having the lowest altitude in the predetermined area, and the determined altitude data of the charging location and/or the vehicle located at the charging location.

8. The method of claim 2, wherein stopping, by the processor device, the charging at the predetermined charging level below the nominally fully charged level of the battery, or stopping, by the processor device, the charging at the nominally fully charged level of the battery, is determined solely in response to whether the maximum altitude drop is above or below the predetermined altitude drop threshold.

9. The method of claim 2, wherein stopping, by the processor device, the charging at the predetermined charging level below the nominally fully charged level of the battery, or stopping, by the processor device, the charging at the nominally fully charged level of the battery, is determined without calculating, by the processor device, the regenerative braking of the vehicle along the roads in the predetermined area.

10. The method of claim 2, wherein stopping, by the processor device, the charging at the predetermined charging level below the nominally fully charged level of the battery, or stopping, by the processor device, the charging at the nominally fully charged level of the battery, is determined without receiving, by the processor device, a predetermined destination of the vehicle in the predetermined area.

11. The method of claim 2, further comprising:
determining, by the processor device, a predetermined destination of the vehicle, the predetermined destination being separated from the charging location by a predetermined road, wherein the maximum altitude drop of the topography in the predetermined area relative to the determined altitude data is determined for the predetermined route.

12. The method of claim 2, further comprising:
setting, by the processor device, the predetermined area to a maximum radius of between 10 km and 50 km from the charging location.

13. The method of claim 2, further comprising:
setting, by the processor device, the predetermined altitude drop threshold to a value of: between 200 m and 300 m for a predetermined area having a radius of between 0 km and 10 km; or between 300 m and 600 m for a predetermined area having a radius of between 10 km and 20 km; or between 600 m and 1200 m for a predetermined area having a radius of between 20 km and 50 km.

14. An energy storage system of a vehicle, the energy storage system comprising a battery connectable to regenerative braking system configured to charge the battery by regenerative braking of the vehicle, and a control unit configured to:
determine altitude data of at least one of a charging location and the vehicle located at the charging location,
determine topography in a predetermined area around the charging location,
determine a maximum altitude drop of the topography in the predetermined area relative to the determined altitude data,
instruct charging of the battery of the vehicle from an external power source of the charging location,
stop the charging at a predetermined charging level below the nominally fully charged level of the battery in response to the maximum altitude drop being above a predetermined altitude drop threshold,
stop the charging at the nominally fully charged level of the battery in response to the maximum altitude drop being below the predetermined altitude drop threshold.

15. A charging location for charging a battery of a vehicle, the charging location comprising an external power source and a control unit configured to:
determine altitude data of at least one of the charging location and a vehicle located at the charging location,
determine topography in a predetermined area around the charging location,
determine a maximum altitude drop of the topography in the predetermined area relative to the determined altitude data,
instruct charging of a battery of the vehicle from the external power source of the charging location,
stop the charging at a predetermined charging level below the nominally fully charged level of the battery in response to the maximum altitude drop being above a predetermined altitude drop threshold,
stop the charging at the nominally fully charged level of the battery in response to the maximum altitude drop being below the predetermined altitude drop threshold.

16. A vehicle comprising the processor device to perform the method of claim 2.

17. The vehicle of claim 16 further comprising the regenerative braking system configured to charge the battery by regenerative braking of the vehicle, and a service braking system configured to brake the vehicle independently of the regenerative braking system.

18. A non-transitory computer program product comprising program code for performing, when executed by a processor device, the method of claim 2.

19. A control system comprising one or more control units configured to perform the method of claim 2.

20. A non-transitory computer-readable storage medium comprising instructions, which when executed by the processor device, cause the processor device to perform the method of claim 2.

* * * * *